US006336544B1

(12) United States Patent
Blad et al.

(10) Patent No.: US 6,336,544 B1
(45) Date of Patent: Jan. 8, 2002

(54) COIN COLLECTION SYSTEM

(75) Inventors: Steven J. Blad, Henderson; Kenneth R. Dickinson, Las Vegas, both of NV (US)

(73) Assignee: Casinovations Incorporated, Las Vegas, NV (US)

( * ) Notice: Subject to any disclaimer, the term of this patent is extended or adjusted under 35 U.S.C. 154(b) by 0 days.

(21) Appl. No.: 09/259,207

(22) Filed: Mar. 1, 1999

(51) Int. Cl.[7] .............................................. G01G 19/42

(52) U.S. Cl. ........................................ 194/217; 232/15

(58) Field of Search ................................ 194/202, 217, 194/350; 453/17; 232/15, 16; 177/25.17

(56) References Cited

U.S. PATENT DOCUMENTS

| | | | | |
|---|---|---|---|---|
| 2,815,166 A | * 12/1957 | Sollenberger | ................ | 232/16 |
| 5,056,643 A | * 10/1991 | Kirberg | ...................... | 194/202 |
| 5,259,491 A | * 11/1993 | Ward, II | ..................... | 194/350 |
| 5,469,951 A | * 11/1995 | Takemoto et al. | .......... | 194/206 |
| 5,531,309 A | * 7/1996 | Kloss et al. | ................ | 194/202 |
| 5,619,932 A | * 4/1997 | Efland et al. | ............... | 194/350 |
| 5,620,079 A | * 4/1997 | Molbak | ...................... | 194/217 |
| 5,732,878 A | 3/1998 | Schroder et al. | ............ | 232/1 D |
| 5,875,879 A | 3/1999 | Hawthorn | .................. | 194/350 |

* cited by examiner

*Primary Examiner*—F. J. Bartuska
(74) *Attorney, Agent, or Firm*—Siemens Patent Services, LC

(57) ABSTRACT

A mobile inventorying and collection apparatus includes a mobile cart for immediate inventorying of moneys collected in a coin collection box at an area adjacent to a host machine such as a gaming machine, and collecting in a secured receptacle of the mobile cart inventoried coins and tokens in a secured manner, and transmitting this data as well as identification data of the coin box to either a CPU provided on-board the mobile cart for later downloading to a remote data management control system, or directly to the remote data system.

33 Claims, 8 Drawing Sheets

COIN COLLECTION SYSTEM

BACKGROUND OF THE INVENTION

1. Field of the Invention

The present invention relates to a coin receiving box associated with operation of a host coin accepting machine. The coin collection box is removable from the machine, and is interchangeably inserted selectively into any one of several similar machines. The coin box contains memory for establishing both temporary and permanent electronic records, and has electrical contact surfaces enabling communication with its host machine. The coin box has guiding structure for assuring that it is correctly inserted into its host machine. Both the guiding structure and the electrical contacts enable reversible insertion into the host machine.

The invention is further directed to a mobile inventorying apparatus and method for receiving moneys such as coins and tokens collected from a slot machine in a secure manner.

2. Description of the Prior Art

Certain activities, such as vending and gaming, are available to the public in commercial premises dedicated to these activities. These premises contain gaming machines which operate automatically when a patron inserts coins or tokens into the machine. Gaming machines tend to amass coins or tokens rapidly, and must periodically be emptied. Since machine operation is equally feasible with coins and tokens, discussion from this point forward will refer to coins, it being understood that tokens may be substituted to similar effect.

In particular, gaming machines are available in large numbers in casinos. Large numbers of people enjoy using these machines, which may all be in use despite the number of machines available. To enable rapid reestablishment of operability after retrieval of coins, gaming machines are provided with interchangeable, removable coin collection boxes. Service personnel employed by the casino come to a gaming machine with an empty coin collection box, remove the full box, and insert the new box. The full box is then brought to a counting facility for accounting and verification of its contents.

Many boxes may be present simultaneously at the counting facility. Various schemes have been employed to enable the casino to know which box is associated with which gaming machine. These schemes use printed numbers on small pieces of paper, or serial numbers printed on the side of coin boxes. Both methods are prone to human error and mistake.

The casino may easily fail to recover all coins which theoretically are present in the coin box. Such loss may stem from either of two possibilities. One is that the bin was misaligned within its host gaming machine, so that some coins could fail to enter the box. In this case, the coins could lodge within recesses in the machine, or be retrieved and pocketed during removal of the box by dishonest personnel servicing the machine. These personnel may also remove coins from the interior of the box, even when the coins have properly entered the box.

Although casinos have automated systems utilizing the master computer for calculating a total sum which theoretically has been amassed by the machines, the system falls short of being able to pinpoint specific causes of loss. This is because large numbers of coin or token bins are received at the counting facilities, and it is not possible to identify which box was short of its calculated receipts. It is merely possible to calculate that the sum of the coins actually collected falls short of theoretical receipts. Thus the operator of the premises cannot identify poorly installed bins and dishonest employees.

A coin receiving machine having a removable coin collection box and electronic memory devices contained within both machine and box is shown in U.S. Pat. No. 5,056,643, issued to Bernd Kirberg on Oct. 15, 1991. Kirberg's device is a vending machine rather than a gaming machine, and lacks the arrangement of guiding structure assuring appropriate and reversible mating of the coin collection box within the host machine and electrical contacts found in the present invention.

Mechanical disconnection of an electronic memory device within a coin receiving machine upon removal of a coin collecting receptacle is shown in U.S. Pat. No. 5,485,285, issued to Jerome Remien on Oct. 17, 1995. Remien's machine is not a gaming machine, and lacks the arrangement of guiding structure assuring appropriate and reversible mating of the coin collection box within the host machine and electrical contacts found in the present invention.

Keyed insertion of a coin collecting receptacle into a host machine is exemplified in U.S. Pat. No. 2,371,114, issued to Walter Von Stoeser on Mar. 6, 1945. Stoeser's arrangement does not allow for reversible insertion of the receptacle, as provided in the present invention. Also, Stoeser's machine is not a gaming machine, and lacks electronic memory and electrical contacts enabling communication to electronic memory, as found in the present invention.

None of the above inventions and patents, taken either singly or in combination, is seen to describe the instant invention as claimed.

SUMMARY OF THE INVENTION

The present invention provides structural cooperation between a coin collecting box and its host machine so that the box is reversibly insertable into the host machine and so that accurate positioning of the box within the host machine is assured. The coin box and the cavity of the host machine are each provided with complementary grooves or projections assuring appropriate alignment of the box.

A preferred configuration of guiding members includes a low upwardly oriented projection disposed upon the flat floor of the cavity of the host machine. The coin box has a flat floor including short depending walls which partially surround and closely cooperate with the projection when the coin box is fully inserted and lowered into position. Both the projection of the host machine and the walls of the coin box are inclined, so that lowering the coin box also centers the coin box over the projection. The coin box is configured to avoid cracks and crevices into which coins may lodge, be concealed, or otherwise be lost.

The host machine and the coin box are each provided with electronic memory devices for storing information relating to the identity of each and with circuitry enabling communication between the two memory devices. Each memory device receives information relating at a minimum to cumulative count of coins and to the identity of its partner memory device. Therefore, when the coin box is returned to the mounting facility, the operators of the casino may ascertain which coin box has been associated with which gaming machine. Any shortage of coins will be attributable to the correct source of the loss, and remedial steps may then be taken. At the same time, counting and verification of other machines and coin boxes may proceed independently of a short count relating to any one particular coin box.

To enable communication between box and host machine, electrical contacts are provided in each such that they will be operable regardless of direction of insertion of the coin box into the host machine. The communication circuits completed by mating of these contacts are separable, or broken when the coin box is removed. Contact is preferably sliding in nature rather than depending upon interfering abutment. Effective contact may then ensue without requiring the extreme precision required for abutting contact.

The arrangement of the contacts reduces requirements for precision when mating. Unlike connection devices such as multipin connectors, which must be carefully aligned prior to mutual engagement, the electrical contacts act automatically, requiring no attention from the installing personnel whatsoever. Physical alignment of the coin box within the cavity of the host machine is the only requirement. Cooperation between the depending walls of the coin box and the projection of the host machine assures that it is nearly impossible to misalign the two.

The electrical contacts are disposed upon the flat upper surface of the projection of the host machine and upon the flat floor of the coin box. In an alternative to actual contact, communicable engagement may be accomplished by induction. Coils embedded within the box and the host machine on the flat surfaces will cause signals to be transferred inductively without resorting to actual contact.

According to another aspect of the invention, a mobile inventorying and collection apparatus provides for immediate inventorying of moneys collected in the coin box at an area adjacent to the host machine, and transfer of the inventoried monies to a secured receptacle on-board the mobile apparatus, preferably for later transfer to a secured coin repository. Host machines may be gaming machines, vending machines, change machines or other machines in which monies are collected, without limitation. The mobile apparatus may be a transportable cart or other conveyance for supporting the system components described below in greater detail.

The system preferably includes the coin box which is interchangeably received by both the host machine for initial collection and the mobile cart for measurement, including weighing collected moneys on a scale provided on the mobile apparatus. Information identifying the coin box and inventory information specific to the coins and tokens received and collected from the host machine is transmitted to either a CPU provided on-board the mobile cart for later downloading to a remote data management system, or directly to the remote data management system. Such data transmission may be concurrent with collection processing, or batch downloaded after collection of moneys from a plurality of host machines. After the coin box has been inventoried, its contents are then transferred to a secure receptacle provided on-board the mobile cart, and the coin box is returned to its designated host machine for subsequent coin collection, thereby immediately placing the host machine, such as a gaming machine, back in service using the original coin box.

The coins/tokens may be segregated by numerical denomination in the mobile inventorying system, for separate secured retention in corresponding receptacles provided in the mobile cart. Paper money or scrip may be collected and accounted for by the apparatus of the invention. The mobile cart is then preferably advanced to a subsequent host machine as necessary to inventory all host machines in a particular location and efficiently and securely collect monies in the manner previously described. The mobile cart may be retrofittable to existing cart systems, configured to hand or vehicle transfer systems, or self-propelled in an automatic delivery system to deliver inventoried moneys to a remote count room or other receiving facility. According to another embodiment of the invention, the mobile apparatus includes a self-propelled tow vehicle provided with inventorying and collection apparatus and one or more coin collection carts, each having one or more secure receptacles, to be towed by the tow vehicle adjacent to the host machines to be inventoried.

Accordingly, it is a principal object of the invention to provide a coin receiving machine and mobile inventorying and collection apparatus having a removable coin collection box for interchangeable use with the coin receiving machine and mobile inventorying and collection apparatus, and a removable coin collection box for use with a mobile inventorying and collection apparatus for immediate inventorying of moneys collected in the coin box, and electronic memory apparatus for recording the identity of both the machine and the coin collection box, so that upon removal of the coin collection box and retrieval of its contents, the retrieved contents may be reconciled with records of the sum inserted into the machine, and to provide immediate inventoried and secure retention of gaming monies collected by the host machine.

A second object of the invention is that the box be provided with memory for retaining its identity independently of other memory devices external to the coin collection box.

It is another object of the invention that the coin collection box and the host machine cooperatingly interfit to assure appropriate alignment between the two.

It is a further object of the invention to provide apparatus which will transmit electrical or electronic signals between the coin collection box and its host machine when the former is correctly installed within the latter, and which will prevent signal transmission when the former is not correctly installed within the latter.

Still another object of the invention is to enable reversible insertion of the coin collection box within the host machine, while preserving communicable engagement therebetween.

Yet a further object of the invention is to configure the coin collection box to avoid construction wherein cracks and crevices are present, and in which cracks and crevices coins may lodge.

An additional object of the invention is to provide cooperating inclined surfaces promoting centering of the coin collection box within the cavity of the host machine receiving the coin collection box.

It is again an object of the invention to provide an electronic memory device within both the host machine and the coin collection box, and separable circuitry for communicating between the two memory devices.

Still another object of the invention is to prevent loss of coins due to pilferage.

Yet another object of the invention is to provide a gaming machine having electronic memory and a readily insertable coin collection box having electronic memory and separable circuitry for communicating between the memory of the collection box and the memory of the gaming machine.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
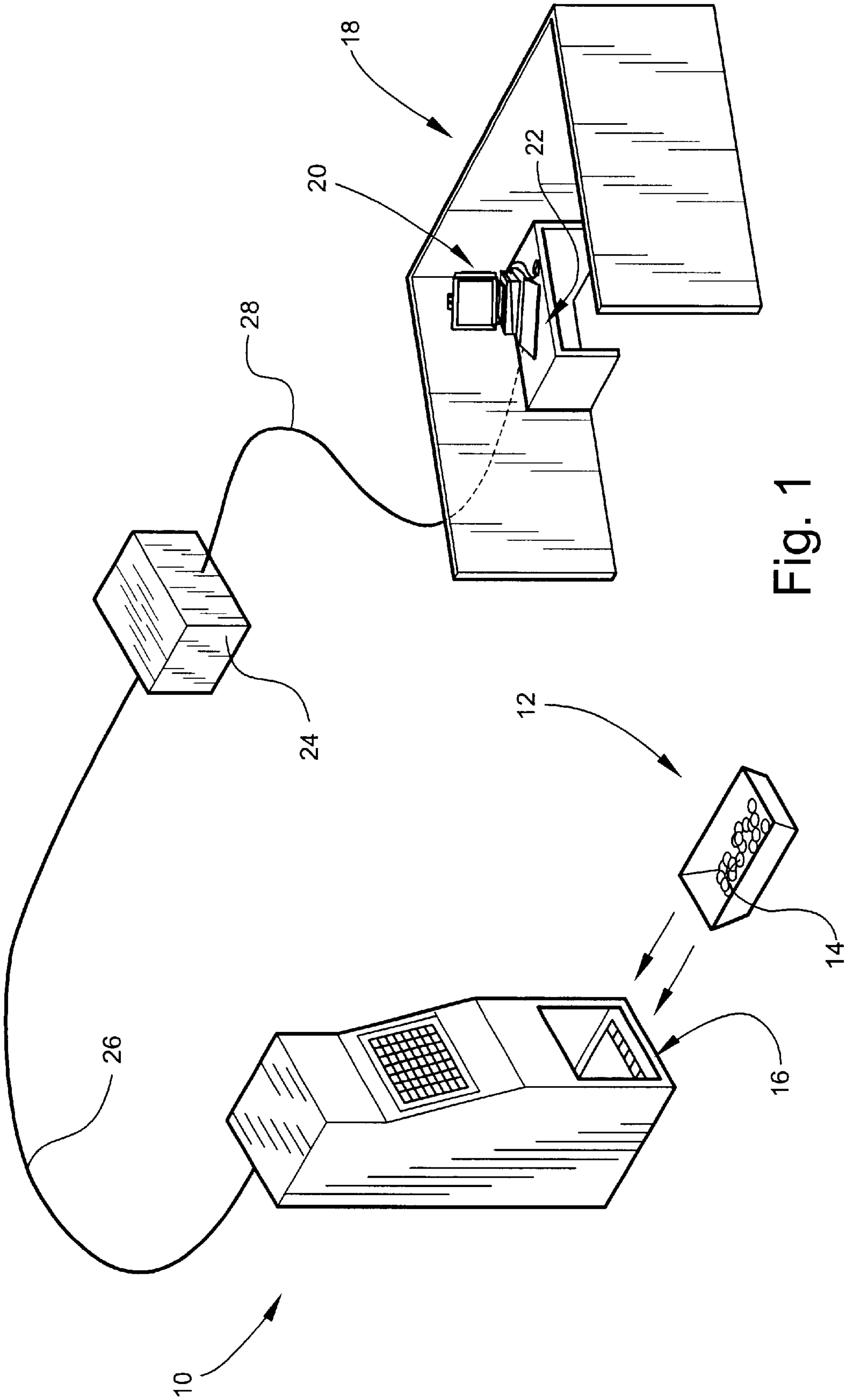
FIG. 1 is a perspective, environmental, diagrammatic view of the coin collection system of the invention, showing slot machine coin collection application in a casino.

FIG. 1 shows the present invention as it would be employed in a casino (not shown in its entirety). The invention comprises a coin operated machine 10 having a removably insertable coin collection box 12 for receiving and storing coins 14 inserted into machine 10. It will be understood that the coin collection box 12 may be used to collect paper money and scripp according to the invention, for use with machines 10 that require paper money or scripp for operation. Coin box 12 is periodically removed for counting and retrieving coins 14. A similar coin box (not shown) is inserted into a cavity 16 serving as a receptacle for containing coin box 12 when machine 10 is in use. Coin box 12 is designed to be reversibly inserted into cavity 16 in the interests of efficiently replacing coin boxes and expeditiously returning machine 10 to active service.

In a typical casino, coin box 12 is carried on a cart (not shown) together with other coin boxes (not shown) to a counting facility 18 for retrieval of coins and reconciling of accounts. Counting facility 18 has a computer monitor 20 and a keyboard 22. Machine 10 has a memory device (see FIG. 2) which is employed in tracking receipts and disbursements made by machine 10. This information is communicated to a central computer 24, which includes another memory device, by any suitable method, such as by cable 26. Monitor 20 and keyboard 22 communicate with computer 2 by cable 28. Information contained in the two memories further includes data identifying which coin box has served machine 10 during a specified time period. The operator of the casino may thus account for shortages in the count of retrieved coins, and may pinpoint the source of any loss as accruing from pilferage or from mechanical failure. Identities of the personnel removing and returning coin box 12 may also be tracked in the memories.

Figure 2:
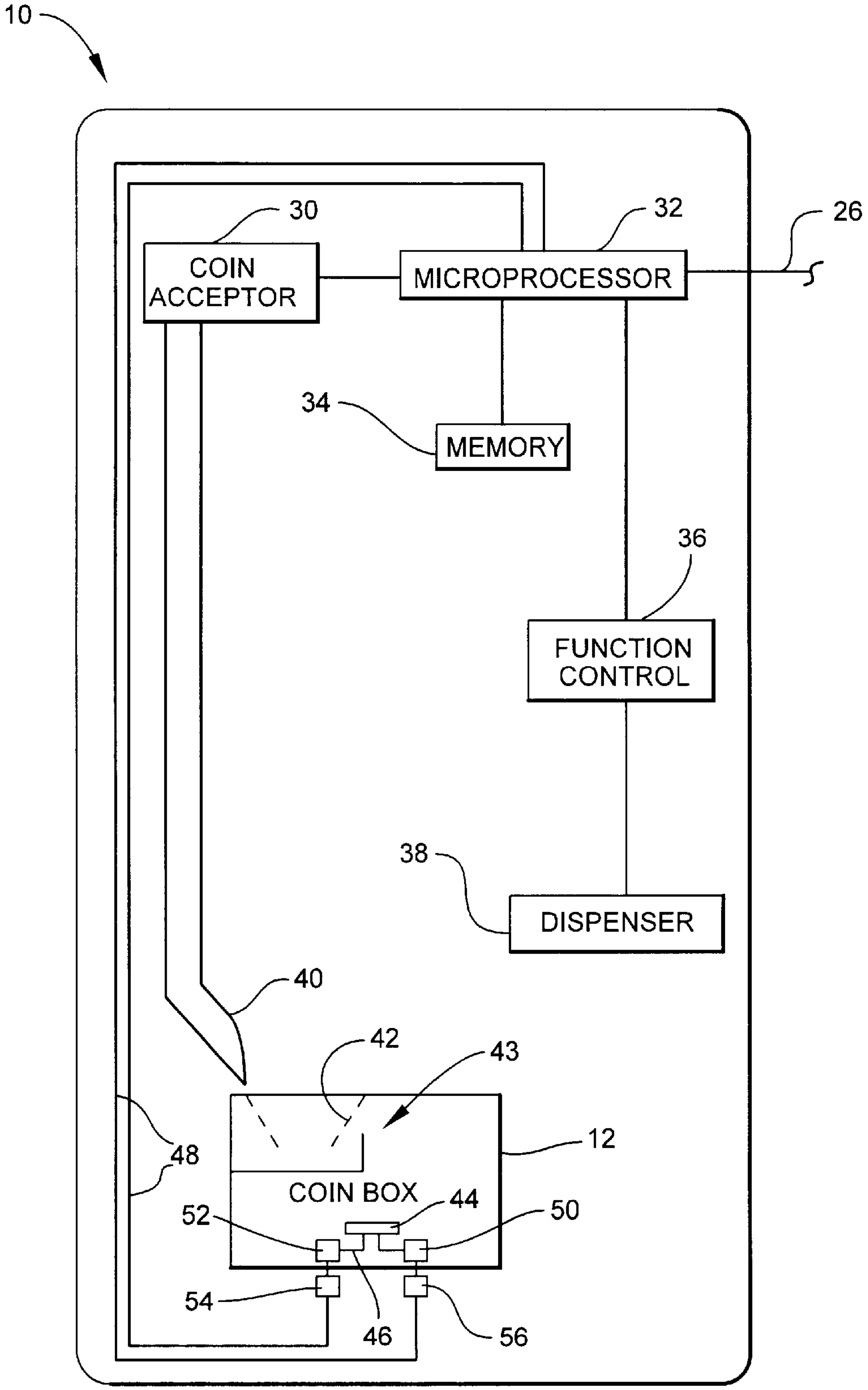
FIG. 2 is a front elevational, diagrammatic view of the invention.

FIG. 2 shows typical components of machine 10. A coin accepting apparatus 30 receives coins, verifies authenticity and value of coins, and sends a signal to a microprocessor 32 enabling activities to proceed if sufficient value has been received. Microprocessor 32 has an associated memory device, such as RAM 34. A function controller 36 is enabled by a signal from microprocessor 32 to accept commands from the patron of machine 10 responsive to acceptance of a coin by coin accepting apparatus 30 and determination of sufficient value for the requested function.

In gaming machines, the function will relate to gaming or gambling. In this case, the function will be performing a calculation of a random chance result, and dispensing a return based upon the chance result. The return, made by a dispenser 38, may be a payoff if the chance result favors the patron, and will result in retention of inserted money by machine 10 if the chance result does not favor the patron.

The present invention is equally applicable to machines performing functions other than gaming. For example, the machine may be a vending machine (not shown). If this were the case, then dispenser 38 would comprise well known apparatus for selecting and dispensing merchandise, and optionally for making change.

Coin box 12 is diagrammatically shown in a predetermined, operative position within machine 10. This signifies that coin box 12 is correctly positioned to successfully receive coins delivered thereinto by machine 10, thereby defeating a potential source of loss, i.e., spillage past the coin box 12. If the function being performed results in a determination that an inserted coin should be retained by machine 10, then that coin is routed to coin box 12. This is indicated diagrammatically by chute 40. Alignment of chute 40 with coin guide 42, which leads to a coin storage receptacle 43, represents the operative position of coin box 12 within machine 10.

Of course, machine 10 may retain coins for potential return to the patron. Apparatus for accomplishing this is well known and may be incorporated for the successful operation of machine 10 if desired.

The operative position further signifies that coin box 12 is properly aligned to assure completion or connection of communications circuitry. It being recalled that coin box 12 has a memory device 44, circuitry 46 is provided to transmit signals to memory device 44. Circuitry 46 is connected to complementary circuitry 48, which complementary circuitry 48 is in turn connected to memory device 34. Final connections are made by electrodes 50, 52 of circuitry 46 and electrodes 54, 46 of circuitry 48. Cable 26 may be regarded as a further component of circuitry 48, and performs the function of transmitting communication signals between microprocessor 32 and its associated memory device 34 and external computer 24 and its associated memory device (not shown apart from computer 24).

An operator may utilize keyboard 22 to query microprocessor 32 of machine 10, in order to receive information from machine 10 prior to receiving coin box 12. The same information available from microprocessor 32 may be entered into memory device 44 of coin box 12. Alternatively, some information may be restricted from memory device 34 or from memory device 44, so that there may be a difference in entered data between these components. Many algorithms or programs may be utilized in controlling and communicating between computer 24 and memory devices 34 and 44, depending upon the exact functions to be performed. These algorithms are well known or may be created especially for the application by those of skill in the art.

Figure 3:
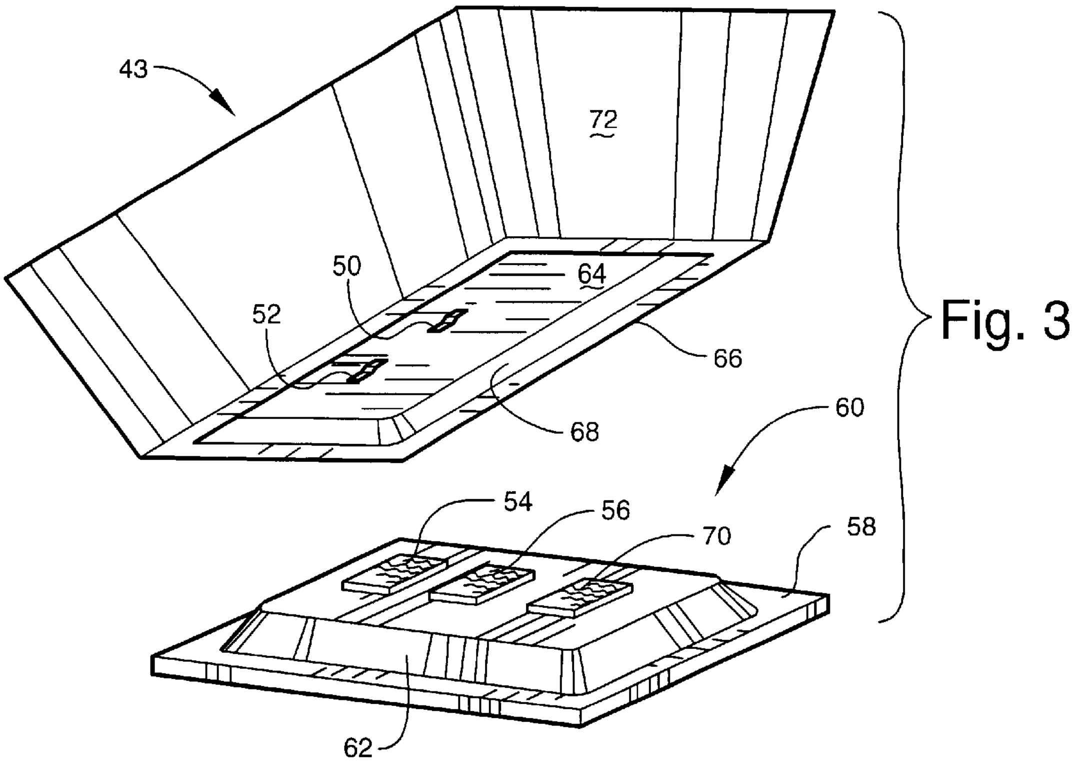
FIG. 3 is an exploded perspective detail view of components seen at the bottom of FIG. 2.
Figure 4:
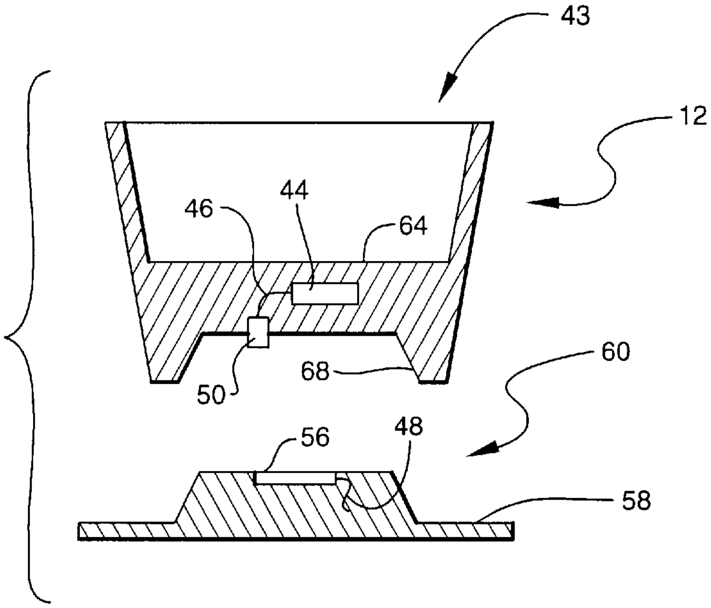
FIG. 4 is a front cross sectional view of the components of FIG. 3.

Interfitting cooperation between coin box 12 and cavity 16 (see FIG. 1) is shown in FIGS. 3 and 4. Cavity 16 has receiving structure for removably receiving and locating coin box 12, comprising a floor 58 and a projection 60 projecting upwardly from floor 58. Projection 60 has an inclined lateral wall 62 which gives projection 60 a tapered configuration wherein the top is smaller than the bottom. Coin box 12 has guiding structure including a bottom panel 64 and a wall 66 depending from bottom panel 64. Wall 66 has an inclined surface 68 complementing and closely cooperating with tapered projection 60.

When coin box 12 is inserted into cavity 16 and released, coin box 12 will be urged by gravity to attain the predetermined position, shown representatively in FIG. 2, beneath chute 40 (see FIG. 2) or equivalent structure for depositing coins into receptacle 43.

In the present example, corresponding inclination of wall 62 and surface 68 urges coin box 12 to become centered over projection 60. Of course, inclination of wall 62 and surface 68 could be reversed to the same effect. In other embodiments (not shown), it would be possible that corresponding receiving structure of a coin operated machine and guiding structure of the coin box be differently configured. For example, the coin box could be urged to the left, right, or to the rear, or to an intermediate position having combined characteristics of these directions.

Electrodes 50, 52 and 54, 56 and their respective alignment are also shown in FIG. 3. Electrodes 50 and 52 are exposed from below panel 64, and will make physical contact with electrodes 54, 56, which are exposed from above projection 60 when coin box 12 is lowered into the predetermined position.

Preferably, contact is sliding contact, rather than requiring penetration and consequent careful alignment of the respective male and female electrodes (not shown). In addition to sliding contact, electrodes 50, 52 and 54, 56 are arranged serially with respect to the direction of insertion of said coin box into said coin operated machine, so that coin box 12 need be moved in a straight line, and not necessarily moved in a complex manner to assure mating of the contacts 50, 52, 54, 56. The relative large size of one of the two sets of electrodes 50, 52 or 54, 56 assures contact even if coin box 12 is slightly misaligned relative to projection 60.

An additional electrode 70 is disposed upon projection 60 and connected in common with electrode 54. This arrangement assures that coin box 12, which is of symmetrical construction, may be inserted into cavity 16 with end wall 72 facing either to the rear of machine 10 or to the front thereof. Thus, machine 10 and coin box 12 are arranged to accept reversible insertion of the latter into the former. Simultaneously, electrodes 50, 52, and their corresponding electrodes 54, 56 of projection 60 are linearly alignable regardless of directional orientation of coin box 12 within machine 10, and will come into operative proximity when coin box 12 attains its predetermined position within operated machine 10.

FIG. 4 shows a preferred configuration of coin box 12 wherein upwardly projecting lateral walls of receptacle 43 are inclined such that the top of receptacle 43 is wider than the bottom thereof, and all internal surfaces are continuous and lack cracks and crevices which could otherwise trap or conceal coins. This view also shows the close cooperation between projection 60 and surface 68, and the arrangement of memory device 44 and contact 50 within panel 64.

Figure 5:
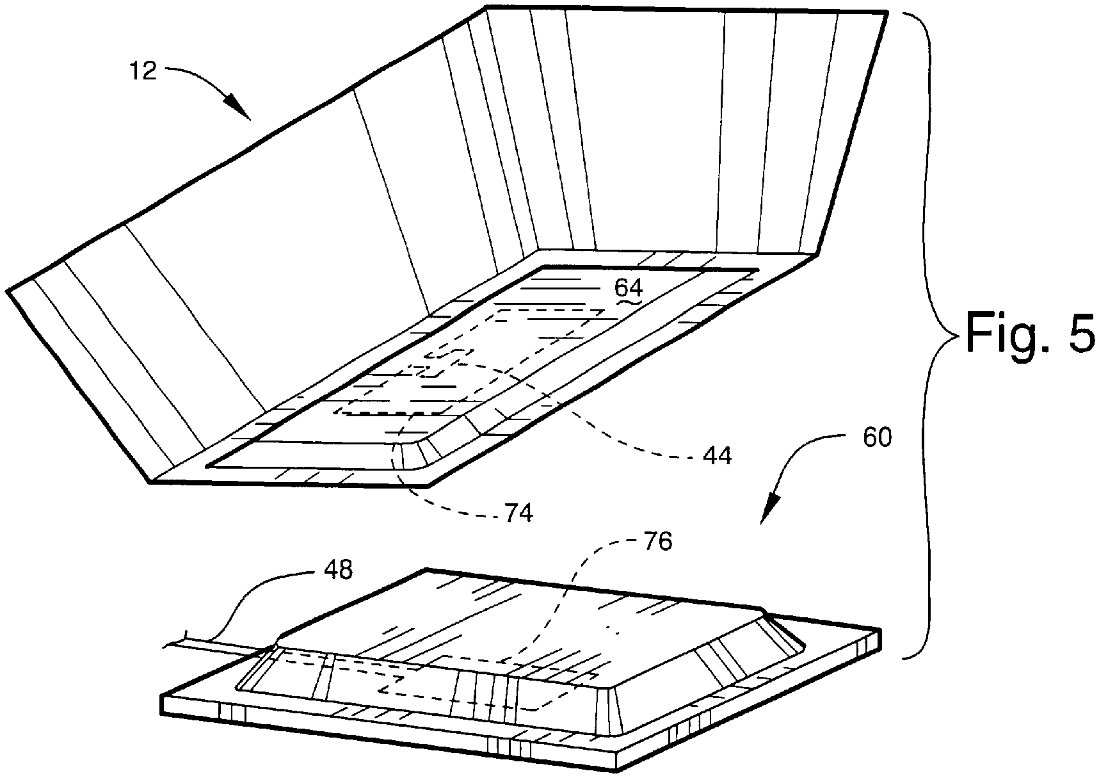
FIG. 5 is a view similar to that of FIG. 3, but illustrating a first alternative embodiment.

The arrangement of contacting electrode 50, 52, 54, 56 may be replaced by electrodes featuring non-contacting communication. As shown in FIG. 5, coin box 12 may be provided with an induction coil 74 embedded within panel 64 and connected to memory device 44. Machine 10 has a corresponding induction coil 76 embedded within projection 60, which coil 76 communicates with memory device 34 (see FIG. 2) through circuitry 48. Even though physical contact is absent, operative proximity enables coils 74 and 76 to transmit signals to one another.

Obviously, one of coils 74 or 76 may be replaced by a metal structure the form of which is not critical, in order to react appropriately with the electromagnetic field, depending upon the desired direction of communication. Where a coil 74 or 76 is provided, it will be understood to include a suitable power supply (not shown). The use of inductive coils for communicating signals is conventional and these coils are shown only in representative capacity in FIG. 5.

Figure 6:
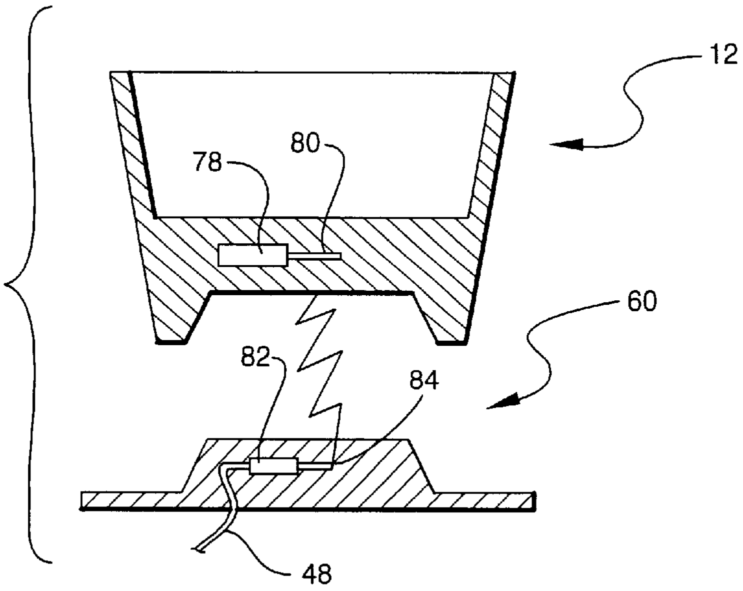
FIG. 6 is a view similar to that of FIG. 4, but illustrating a second alternative embodiment.

Another form of electrodes providing non-contact communication is shown in FIG. 6. Coin box 12 has a radio frequency transmitter and receiver 78 and an associated antenna 80. Of course, transmitter and receiver 78 is connected to memory device 44, although not shown in FIG. 6. Machine 10 has a corresponding radio frequency transmitter and receiver 82 having a respective associated antenna 84. The respective devices indicated as 78 and 82 may, of course, comprise only a transmitter or only a receiver, depending upon the desired scheme of communication. In the embodiments of FIGS. 5 and 6, signal strength will be predetermined so that communication is established only when a predetermined proximity between the communicating elements is attained.

Variations and modifications to the invention may be introduced by those of skill in the art. For example, coin box 12 may be modified so that the front and rear sections of wall 66 enable sliding of coin box 12 on projection 60. Other structure (not shown) may be provided for supporting coin box 12 as it is slid into and out of its operative position within machine 10. Although electronic data handling has been described, optical and other systems may be substituted in whole or in part to similar effect.

Figure 7:
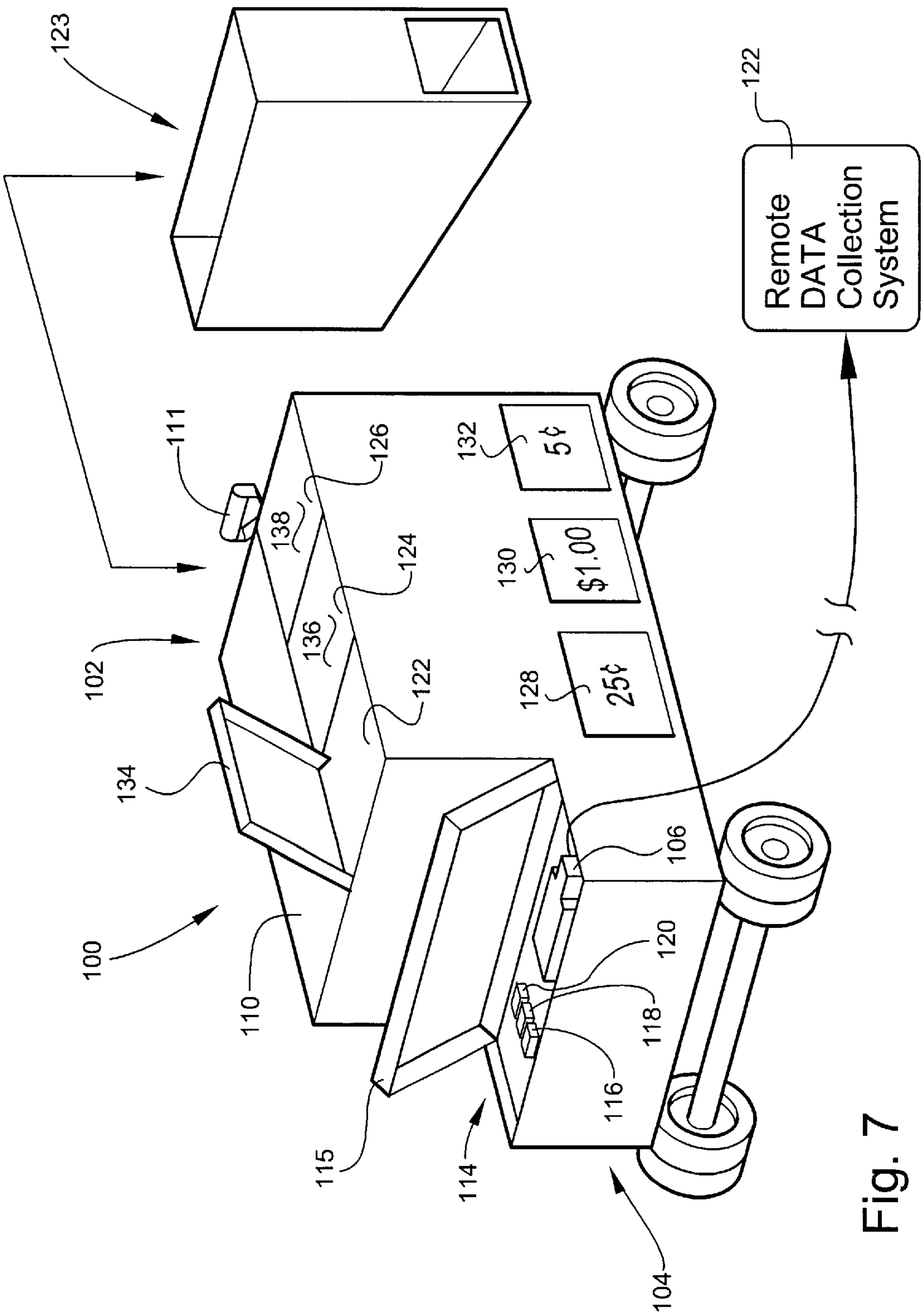
FIG. 7 is a perspective, diagrammatic view of one embodiment of the mobile cart of the present invention, showing a plurality of individual coin/token receiving bins, scale and a CPU mounted on-board the mobile cart.
Figure 8:
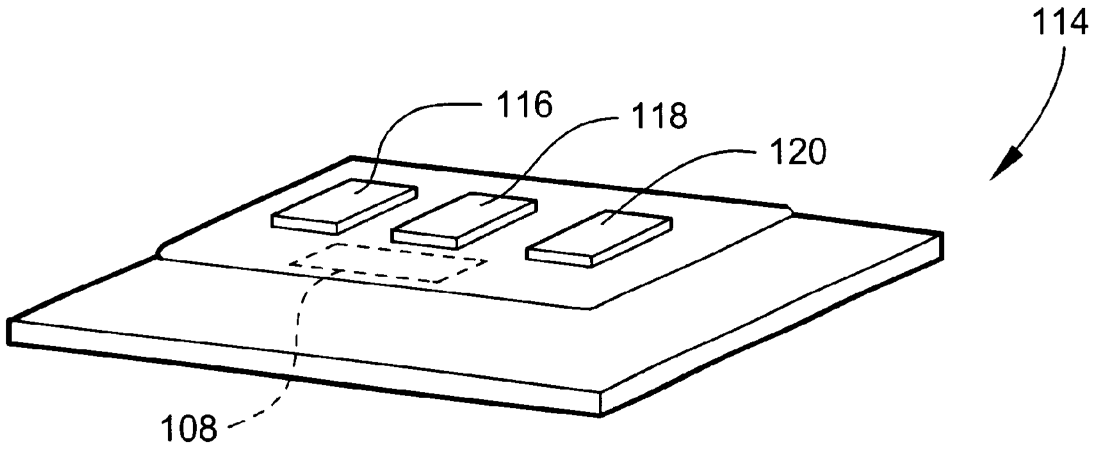
FIG. 8 is a perspective view of a coin collection box receiving platform to be mounted to the mobile cart of the present invention for receiving and weighing a coin box according to the invention.
Figure 9:
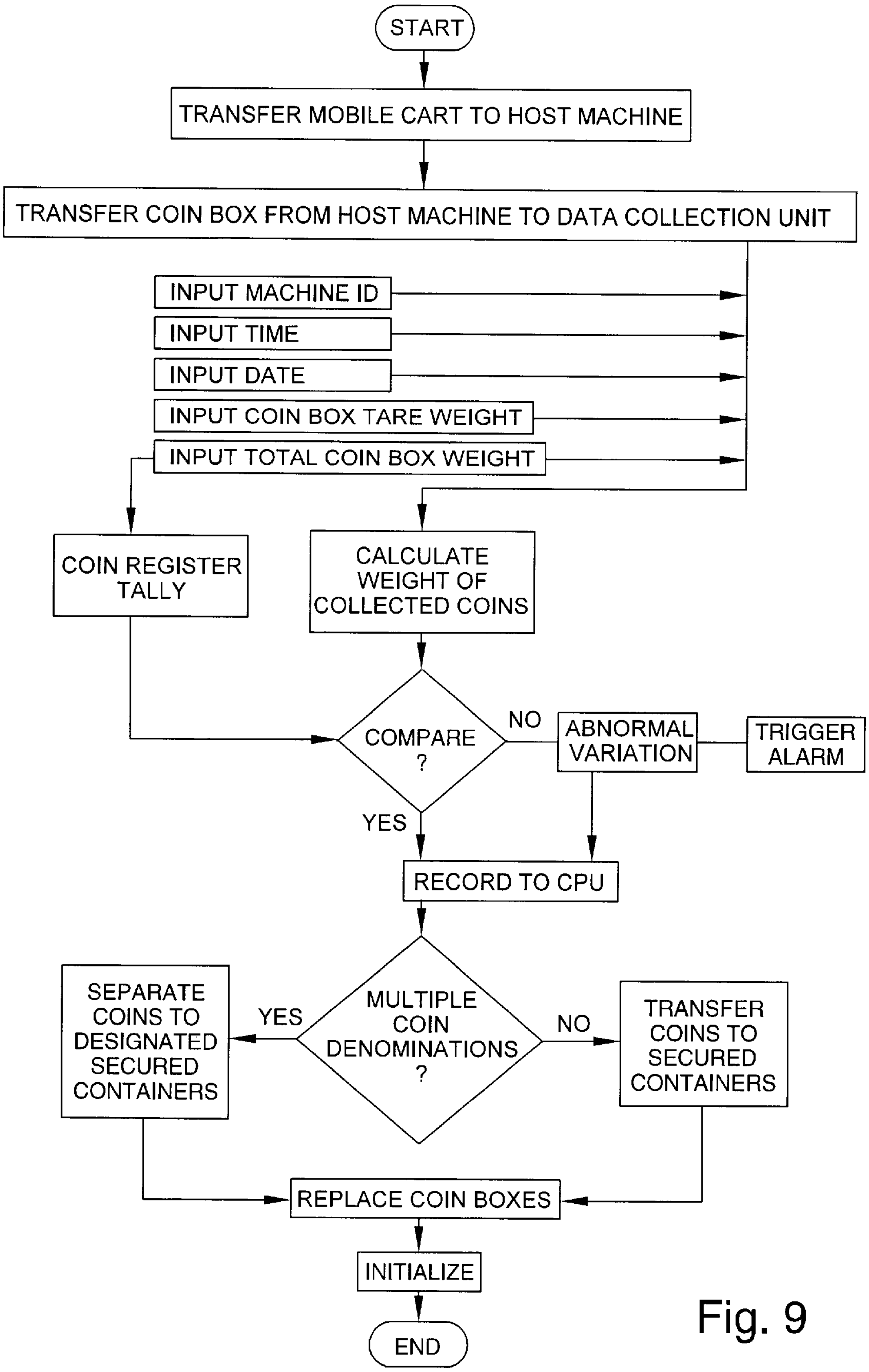
FIG. 9 is a flow chart of a method of receiving and inventorying coins/tokens collected from a host machine, and transmission of equipment- and inventory-specific information and data to on-board and remote CPUs.

As a further improvement, and with reference now to FIGS. 7-9, a mobile inventorying system 100 includes a mobile cart 102 provided with inventorying apparatus 104 for immediate inventorying of moneys such as coins or tokens collected in the coin box 12 (FIG. 1) at an area adjacent to the host machine 10, thereby eliminating the requirement to return the coin box 12 to a remotely-located counting facility to inventory coins/tokens received by the host machine 10. This system is also applicable to the efficient and accurate collection of paper money or scrip, utilizing the apparatus of the present invention to read and transfer the counts of paper money or scrip to the computer system. The system of the present invention is applicable to gaming machines, vending machines, change machines or other machines in which monies are collected, without limitation.

Inventorying apparatus 104 can include an on-board data collection unit CPU 106, an on-board calibrated scale 108, and at least one secure coin/token receiving container 110.

The system preferably includes the coin box 12 for receiving and inventorying coins and tokens received from the host machine 10, and transmitting this data as well as identification data of the coin box 12 to either the on-board CPU 106 provided on-board the mobile cart 102 for later downloading to a remote data management system 120 (and/or central computer 24), or directly to the remote data collection system 120. The coins/tokens may be segregated by denomination in the mobile inventorying system 100.

Processing then continues to additional host machines 10 as necessary to inventory all host machines in a particular location of for example, a casino, and efficiently and immediately update gaming or other money receipts for those coins/tokens received in coin box 12 provided therein in the manner previously described. After each coin box 12 has been inventoried and its contents transferred to the secure coin/token receiving container 110, the coin box 12 is reinstalled in the designated cavity 16 provided in its designated host machine 10. The system components may be installed on a mobile cart 102, or alternatively may be provided on a support structure retrofittably affixable to existing portable wheeled cart systems for operation along tracked or untracked pathways, configured for manual or machine-propelled transfer systems by tow handle 111, or self-propelled under automatic robotic delivery system control to deliver inventoried moneys to a remote count room or other receiving facility.

Specifically, the inventorying apparatus 104 includes a receiving system in which the coin box 12 is removably received on a receiving platform 114 provided with electrically or inductively coupled contacts and circuitry configured for achieving a desired electrical connection of electrodes 50, 52, 70 of the coin box 12 in the manner previously described. An additional set of complementary contacts 1 16, 118 and electrode 120 (corresponding to contacts 54, 56 and electrode 70 shown in FIG. 3) are symmetrically arranged on the receiving platform or in cavity 114 to accept reversible insertion of the coin box 12, and provide positive operative contact with electrodes 50, 52, 70 installed on the underside of the coin box 12. A lid 115 is hingedly affixed to the mobile cart 102 to protect, in the down and closed position, components of the inventorying apparatus 104 provided in a cavity 117 of the mobile cart 102 during periods of non-use.

The coin box 12 is received in the manner previously described and weighed by calibrated scale 108 mounted to the mobile cart 102. The calibrated scale 108 may be any scale useful for determining a weight differential of single coins/tokens passed through the scale apparatus. In connection with coin collection box identifying data, including tare weight of the coin box 12 and designated coinage to be received therein, the net weight and aggregate value of the contents collected in the coin box 12 is transferred to the on-board CPU 106 for on-board storage of this data, to be downloaded to a remote CPU 122. It will be understood that data downloading may occur concurrently with an inventorying operation, or subsequently thereto either on an individual host-machine basis or on a batch basis.

Information gathered by the data collection unit includes mobile cart 102 identification, time and date information, and data transferred from a coin meter 125 (FIG. 3) in the host machine and stored in the coin collection box 12 for use in comparing count and weight and alerting the mobile cart operator to a measured difference between readings obtained from the calibrated scale 108 and coin meter 125 data.

The mobile cart 102 according to the present invention includes a unitary body 120 containing one or more hoppers 122, 124, 126 each designated by placards 128, 130, 132, respectively, for receiving the designated denomination of coins/tokens after measurement. Coins/tokens may be transferred to a bucket 123 to be received within a selected hopper 122, 124, 126. After transfer of coins/tokens to the mobile cart 102, each hopper 122,124,126 is closed with a hinged lid 134, 136, 138, respectively, to be secured in a closed and locked position during transport or non-use of the apparatus 104 or the coins are placed in the hopper through an articulated chute which disallows entry of a retrieving device or human hand to remove the coins/tokens. According to the invention, a mixed aggregation of coins/tokens may be separated by denomination by a coin separator (not shown) into separate hoppers. Also, apparatus may be provided within the hoppers to receive, separate, and stack designated denominations of coins/tokens for reuse in pre-sized, pre-valued stacks.

With reference to FIG. 9, the mobile cart system 100 is preferably operated as follows. The mobile cart 102 is transported adjacent to a host machine 10 designated for coin/token collection. The mobile cart operator extracts the coin box 12 from the host machine 10 and places the coin box 12 on the receiving platform 114 of the mobile cart 102 in the manner previously described with respect to installation within a host machine 10 to achieve full electrical contact between respective sets of electrodes. Aggregate coin/token weight is measured by the calibrated scale 108 after adjusting for coin box tare weight, and this information is transmitted to the on-board CPU 106 via data link 107. Also inputted to the on-board CPU 106 is collection time and date information, mobile cart operator identification, coin box identification and other accounting information gathered from the host machine. According to the invention, and to overcome the prior art problem of lost or unaccounted coins, coin/token data transferred to the on-board CPU 106 from the coin meter 125 is compared with corrected data recorded in the on-board CPU 106 obtained from the calibrated scale 108. a significant discrepancy calculated between the calibrated scale 108 and coin meter 125 causes an alert to be sounded to the mobile cart operator and/or casino operator. The measured discrepancy is further recorded to the remote data collection system 122 for analysis. a paper bill counter (not shown) can be used instead of the coin meter 125 during collection of paper money or scrip. After weighing and accounting of collected moneys information, the contents of the coin box 12 are transferred to the appropriate hopper 122, 124, 126 for secure retention prior to return transport of the mobile cart to a coin/token collection facility during which time data collected in the on-board CPU 106 is preferably downloaded to the remote data collection system 122 for subsequent analysis, reporting, and storage.

Figure 10:
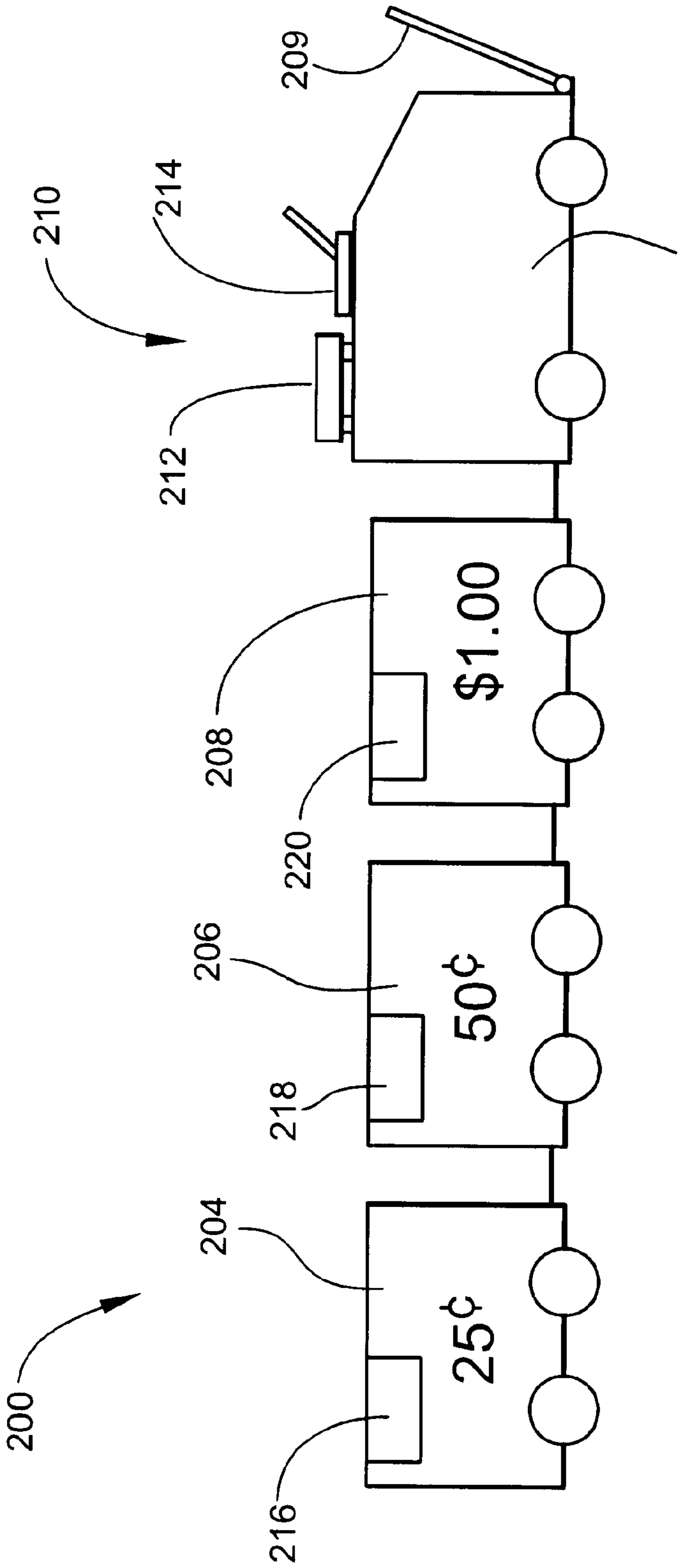
FIG. 10 is a perspective, diagrammatic view of another embodiment of the inventorying and collection apparatus of the present invention, showing a self-propelled tow vehicle for pulling a train of money collection carts, each cart including at least one secure coin/token receiving bin.

With reference to FIG. 10, the present invention further includes mobile apparatus 200 having a self-propelled tow vehicle 202 for towing one or more serially-linked wheeled coin collection carts 204, 206, 208. Alternatively, the mobile apparatus may be configured for operation along tracked or untracked pathways, configured for manual transport by tow handle 209, or self-propelled under automatic robotic delivery system control to deliver inventoried moneys to a remote count room or other receiving facility.

The tow vehicle 202 includes inventorying apparatus 210 for receiving a coin collection box 12 from the host machine 10 in structural and electrical connection with a receiving platform 212 of the tow vehicle 202 in the manner previously described with respect to the mobile cart 102. Aggregate coin/token weight is measured by a calibrated scale (not shown) in the manner previously described, and this information is transmitted to the on-board CPU 214 by wired or modem connection. After inventorying of moneys collected in coin collection box 12, moneys segregated by denomination are transferred to secure receptacles 216, 218, 220 provided in coin collection carts 204, 206, 208, respectively, for secure retention prior to return transport of the mobile apparatus 200, or individual coin collection carts 204, 206, 208, to a coin/token collection facility.

The coin box 12 is reinstalled in the host machine 12, and reinitialized for subsequent use after transfer of moneys to the secured containers provided in the mobile cart 102 or mobile apparatus 200 of the invention. Thus, according to the invention, only a single coin box 12 is required for each host machine 10, eliminating the need to provide a replacement coin box which was previously required when one coin box was removed to a coin/token collection facility. Furthermore, secure collection and accounting of collected coins/tokens is achieved without requiring transport of collected coins/tokens to a remote location for counting.

It is to be understood that the present invention is not limited to the embodiments described above, but encompasses any and all embodiments within the scope of the following claims.

What is claimed is:

1. A method of inventorying moneys from a slot machine comprising the steps of:

(a) delivering to an area adjacent the slot machine a mobile device for receiving moneys collected from the slot machine;

(b) providing a coin receiving box interchangeably useable with the slot machine and the mobile device;

(c) inventorying the collected moneys separately from the slot machine and proximate said mobile device; and (d) after said inventorying step (c), transferring the inventoried moneys from the coin receiving box to a secure container provided in the mobile device.

2. The inventorying method of claim 1, repeating steps (a), (b), (c) and (d) for all slot machines for which moneys are to be collected, and further including the step of inputting inventory information related to each slot machine to a CPU.

3. The inventorying method of claim 2, wherein the CPU is located on-board the mobile device, and comprising the additional step of downloading inventory information from the CPU to a remote data collection device.

4. The inventorying method of claim 1, comprising the additional steps of separating the collected moneys by denomination and transferring the separated moneys into separate secure locations of the receiving device.

5. The inventorying method of claim 4, comprising the additional step of stacking the separated collected moneys.

6. The inventorying method of claim 1, comprising the additional steps of:

(a) providing the coin receiving box with a coin metering device;

(b) comparing collected moneys inventory information with coin input information gathered from the coin metering device; and (c) providing a comparative output comparing said collected moneys inventory information and said coin input information.

7. The inventorying method of claim 1, comprising the additional steps of:

(a) providing the coin receiving box with a coin metering device;

(b) comparing inputed inventory information with coin input information gathered from the coin metering device; and (c) providing a comparative output comparing said inputed inventory information and said coin input information.

8. The inventorying method of claim 1, wherein the inventorying step includes a weight scale.

9. The inventorying method of claim 1 wherein said coin box is adapted to make electrical connection with said slot machine and said mobile device.

10. The inventorying method of claim 1 wherein step (c) includes the step of downloading machine-specific information from said coin receiving box to said mobile device.

11. The inventorying method of claim 10 wherein said machine-specific information includes machine identification information.

12. A method of inventorying moneys collected from a machine comprising the steps of:

(a) delivering to an area adjacent the machine a mobile device for receiving moneys collected from the machine;

(b) providing a coin receiving box interchangeably useable with the machine and the mobile device;

(c) inventorying the collected moneys separately from the machine and proximate said mobile device; and (d) after said inventorying step (c), transferring the inventoried moneys from the coin receiving box to a secure container provided in the mobile device.

13. The inventorying method of claim 12, further repeating steps (a), (b), (c) and (d) for all machines for which moneys are be collected, and further including the step of inputting inventory information related to each machine to a CPU.

14. The inventorying method of claim 13, wherein the CPU is located on-board the mobile device, and comprising the additional step of downloading inventory information from the CPU to a remote data collection device.

15. The inventorying method of claim 12, comprising the additional steps of separating the collected moneys by denomination and transferring the separated moneys into separate secure locations of the receiving device.

16. The inventorying method of claim 15, comprising the additional step of stacking the separated collected moneys.

17. The inventorying method of claim 12, wherein the inventorying step includes a weight scale.

18. The inventorying method of claim 12 wherein said coin box is adapted to make electrical connection with said machine and said mobile device.

19. A system for inventorying moneys collected from a slot machine comprising:

a mobile device having a weighing apparatus comprising a weight scale for inventorying the collected moneys separately from the slot machine;

a receptacle provided in the mobile device for securely retaining the collected moneys after the inventorying thereof; and a CPU to which collected money-specific information is transmitted.

20. The inventorying system of claim 19, wherein the collected moneys include paper money, and a paper money receiving box interchangeably useable with the slot machine and the mobile device.

21. The inventorying system of claim 19 wherein said coin box is adapted to make electrical connection with said slot machine and said mobile device.

22. A device for receiving and inventorying moneys collected from a slot machine having a collected moneys output, comprising:

a mobile cart;

a collected moneys box for receiving and storing moneys transportable between the slot machine output and a weighing apparatus provided on the mobile cart, said weighing apparatus being adapted for weighing moneys removed from said collected moneys box prior to deposition of said moneys in a secured receptacle within said mobile cart;

a secured receptacle for receiving and storing inventoried moneys;

and a CPU for recording inventory information.

23. The device of claim 22, wherein the mobile cart includes a plurality of secured receptacles for receiving denominated separated moneys.

24. The device of claim 22, wherein the collected moneys are coins.

25. The device of claim 22, wherein the collected moneys are paper bills.

26. A device for receiving and inventorying moneys collected from a slot machine having a collected moneys output, comprising:

a tow vehicle including weighing apparatus provided on the tow vehicle;

at least one moneys collection cart for towing by the tow vehicle, the moneys collection cart including at least one secured receptacle for receiving and storing inventoried moneys;

a collected moneys box for receiving and storing moneys transportable between the slot machine output and weighing apparatus provided on the tow vehicle;

and a CPU for recording inventory information.

27. The device of claim 26, comprising a plurality of money collection carts.

28. The device of claim 26, wherein each moneys collection cart includes a plurality of secured receptacles for receiving denominated separated moneys.

29. The device of claim 26, wherein the mobile cart is self-propelled.

30. The device of claim 26, wherein the collected moneys are coins.

31. The device of claim 26 wherein the collected moneys are paper bills.

32. A method for transferring data, and coins or tokens, from a machine that receives coins or tokens to a count room, the method comprising the steps of:

(a) delivering coins or tokens from a coin receiving box associated with the machine to an independent mobile device;

(b) inventorying said coins or tokens using a weighing apparatus external to said machine that receives coins or tokens and proximate said independent mobile device;

(c) after said inventorying step (b), retaining said coins or tokens within said mobile device;

(d) electronically delivering information from the machine to the mobile device;

(e) electronically delivering information from the mobile device to a remote CPU; and (f) delivering the coins or tokens to the count room.

33. The method of claim 32 wherein said information is electronically delivered from the machine to the mobile device by said coin receiving box.

* * * * *